Jan. 25, 1938.  A. LAW  2,106,220
BAFFLE GATE BEARING FOR ONE-WAY ROTATION
Filed Sept. 22, 1936
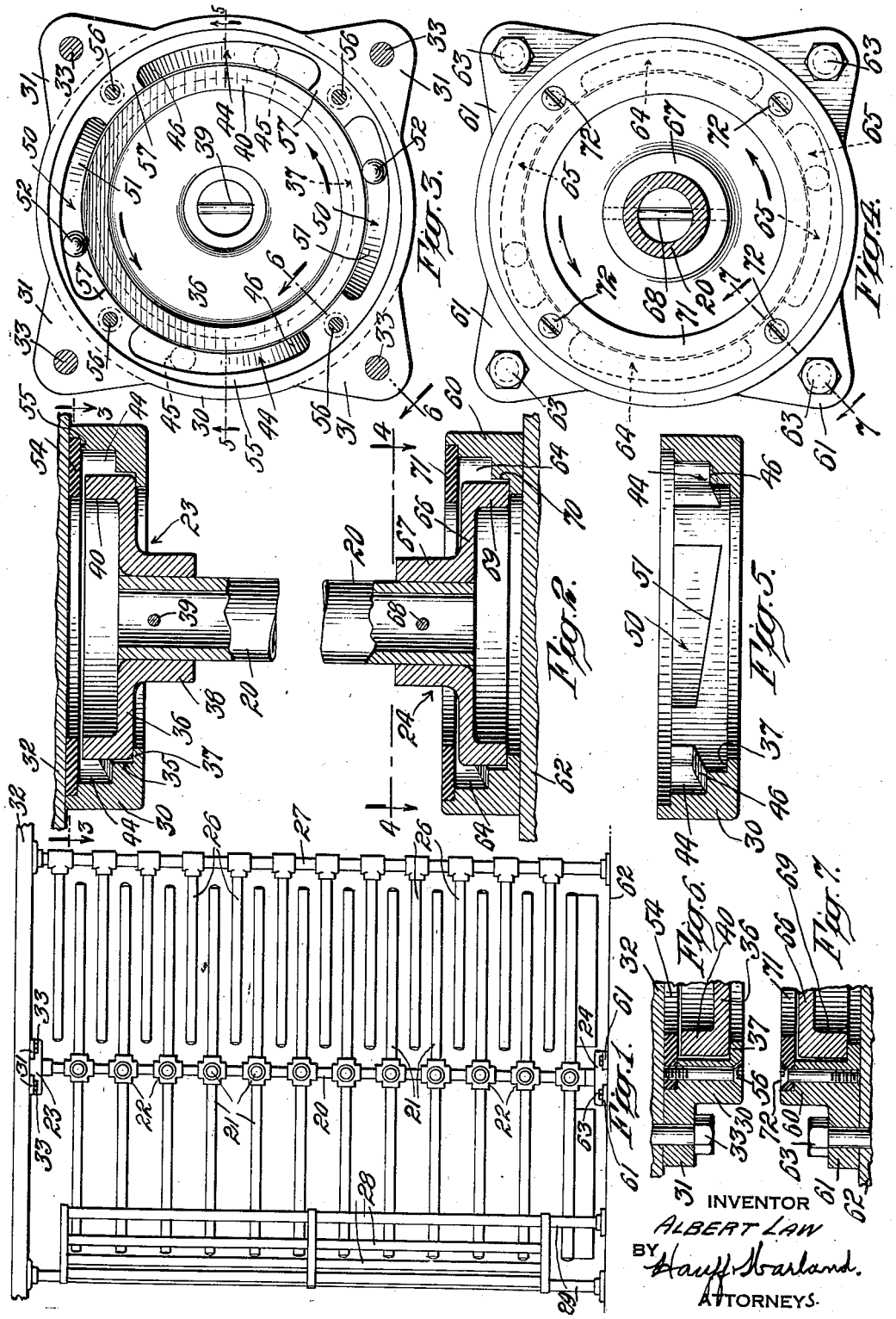
INVENTOR
ALBERT LAW
BY
ATTORNEYS.

Patented Jan. 25, 1938

2,106,220

UNITED STATES PATENT OFFICE 2,106,220

BAFFLE GATE BEARING FOR ONE-WAY ROTATION

Albert Law, Jackson Heights, N. Y.

Application September 22, 1936, Serial No. 101,906

1 Claim. (Cl. 188—81)

This invention relates to baffle gates of the type adapted for use in subways, amusement parks and the like to permit passage of persons in one direction only.

An object of the invention is to provide a cheap, simple, convenient and dependable device of the type above indicated.

Another object is to provide a device of the above type which may be readily reversed in direction or may be locked against turning in either direction.

Other objects and advantages will be apparent as the nature of the invention is more fully disclosed.

The novel features which are believed to be characteristic of this invention are pointed out more particularly in the claim appended hereto. The broader aspects of the invention may, however, be better understood by referring to the following description, taken in connection with the accompanying drawing forming a part thereof, in which one embodiment of the invention has been set forth for purposes of illustration.

In the drawing

Fig. 1 is a side elevation of a baffle gate embodying the present invention.

Fig. 2 is a vertical section showing the upper and lower bearing members for the baffle gate.

Fig. 3 is a horizontal section of the upper bearing member taken on the line 3—3 of Fig. 2.

Fig. 4 is a horizontal section of the lower bearing member taken on the line 4—4 of Fig. 2.

Fig. 5 is a transverse section of the bearing member housing taken along the line 5—5 of Fig. 3.

Fig. 6 is a partial section of the upper bearing member taken along the line 6—6 of Fig. 3 and Fig. 7 is a similar section of the lower bearing member taken along the line 7—7 of Fig. 4.

Referring to the drawing more in detail, the invention is shown as applied to a baffle gate formed by a vertical shaft 20 having a plurality of rotatable arms 21 secured thereto by coupling members 22. The shaft 20 is mounted for rotation in an upper bearing member 23 and a lower bearing member 24 to be described. A plurality of stationary baffle arms 26 mounted upon a vertical post 27 are positioned to extend between the rotating arms 21 so as to limit passage to one side only of the baffle gate. A stationary gate, comprising a plurality of vertical rods 28 mounted upon standards 29, is positioned opposite the stationary arms 26 in the usual manner to define a passageway through the baffle gate.

The upper bearing member 23 is shown more in detail in Figs. 2, 3, 5, and 6 as comprising a housing 30 which is provided with a plurality of ears 31 adapted to be secured to the upper sill 32 by a bolt 33. The housing 30 is provided with a central recess 35 in which an annular member 36 is rotatably held. The annular member 36 rests upon a horizontal flange 37 of the housing 30 and is provided with a hub 38 which is secured to the shaft 20 by a pin 39 and with a flange 40 which extends upwardly within the recess 35. Obviously the hub 38 may be secured to the shaft 20 in other convenient ways, such as by welding.

A pair of diametrically opposite recesses 44 are also provided in the housing 30, said recesses being disposed adjacent the flange 40 of the annular member 36 and forming in connection therewith a pair of channels adapted to receive balls 45 by which the rotation of the annular member 36 is controlled. The recesses 44 are tapered circumferentially in, for example, a counter-clockwise direction, as viewed in Fig. 3 and are provided with inclined bottoms 46 which are arranged so the balls 45 tend to roll along the recesses toward the narrower section thereof. It will be noted that when the annular member 36 is rotated in a clockwise direction the balls 45 roll upwardly along the inclined bottom 46 of the recess 35 to the wider portion of the recesses so as to permit free turning movement of said annular member. When the annular member is turned in a counter-clockwise direction, however, the balls 45 tend to roll downwardly along the inclined bottom 46 of the recesses 44 into the narrower portion of the recess 44 until they become wedged between the side of the recess and the flange 40, thereby locking the annular member 36 against further rotation in that direction.

The housing 30 is also provided with a second pair of diametrically opposite recesses 50 which are arranged similarly to the recesses 44 above mentioned, but are tapered in the opposite direction and are provided with bottoms 51 which are inclined in the opposite direction so that balls 52 in these recesses permit the annular member 36 to be rotated in a counter-clockwise direction, but lock the same against rotation in a clockwise direction.

It is to be understood, of course, that in normal operation only one pair of recesses 44 or 50 are used, the direction of rotation of the annular member 36 being determined by the particular pair of recesses in which the balls 45 or 52 are placed. It is also possible to lock the annular member 36 against rotation in either direction by placing balls 45 and 52 in both recesses. This may be desirable, for example, when an amusement park is to be closed for an extended period of time and provides a simple means for locking the baffle gate to prevent passage of persons therethrough.

An annular cover 54 is seated on a shoulder 55 formed in the housing 30 and is secured by screws 56 inserted through ears 57 in said housing and preferably extending upwardly from the bottom so that they are accessible when the bearing member is in operating position.

In normal operating position the bearing member is secured in the manner above described. When it is desired, however, to remove the same for purposes of inspection, repair or to change the direction of rotation of the baffle gate, the housing 30 may be dropped from the sill 32 by loosening the screws 56 and 33. This permits the housing to be moved downwardly, leaving the annular member 36 and the cover 54 in place. After suitable adjustment of the balls 45 and 52 have been made, the housing 30 may be again positioned against the sill 32 and secured by the means above indicated.

The lower bearing member 24 is formed by a housing 60 which is similar to the housing 30 above described except that ears 61 are formed on the lower part thereof and are adapted to be secured to the lower sill 62 by means of screws 63. This lower housing 60 is provided with a pair of oppositely disposed recesses 64 similar to the recesses 44 above described and with a second pair of recesses 65 similar to the recesses 50 above described. An annular member 66 is formed with a hub 67 secured to the shaft 20 by a pin 68 and with a flange 69 rotatably mounted in a central recess 70 formed in the housing 60. A cover plate 71 covers the recesses 64 and 65 and is secured to the housing 60 by means of screws 72.

This lower bearing member may be adjusted, by positioning the balls in either recesses 64 or 65, for turning either clockwise or counter-clockwise in the same manner as the upper bearing member 23. Access to the recesses 64 and 65 may be had by loosening the screws 72 and removing the cover 71.

It is to be understood that in many instances only one of the bearing members 23 or 24 may be required, in which case the other member may be replaced by a simple bearing. If only one such member is used, it may be positioned either at the bottom or at the top of the shaft 20 as may be convenient in any particular instance.

It will be noted that the particular construction above disclosed is simple and inexpensive and is readily adapted to adjustment to meet varying conditions of use. It is also to be understood that the bearing members may be applied to other types of one way stiles and is not limited to the particular form of baffle gate disclosed herein.

Although a particular embodiment of the invention has been shown for purposes of illustration, it is to be understood that various changes and modifications may be made therein as will be apparent to a person skilled in the art. The invention is only to be limited in accordance with the following claim when interpreted in view of the prior art.

I claim:

A bearing for a baffle plate or the like having a shaft carrying a set of arms, comprising a fixed housing, an annular member secured to said shaft and rotatably held in said housing, two pairs of diametrically opposite channels formed between said housing and said annular member and adapted to receive locking balls, one pair of said channels having a bottom inclined, and being tapered, in a given circumferential direction, the other pair of said channels having a bottom inclined, and being tapered, in the opposite circumferential direction, whereby the positioning of a set of locking balls in either of said pairs of channels will serve to lock said annular member against rotation in one direction only.

ALBERT LAW.